United States Patent Office 3,511,895
Patented May 12, 1970

3,511,895
POLYMERIZATION PROCESS AND PRODUCT THEREOF
Nicholas Kydonieus, Somerville, Sydney P. Spence, Westfield, and Robert F. Blanks and David E. James, Martinsville, N.J., assignors to Union Carbide Corporation, a corporation of New York
No Drawing. Filed Apr. 1, 1966, Ser. No. 539,290
Int. Cl. C08f 19/08, 29/12
U.S. Cl. 260—876                              19 Claims

ABSTRACT OF THE DISCLOSURE

Rubber modified polystyrene and acrylonitrile-butadiene and styrene polymers are prepared by a continuous, three-stage mass polymerization, each stage being maintained under critical conditions with respect to the solid content and reduced viscosity of the material therein so as to obtain a final polymer with a predetermined molecular weight distribution.

---

This invention relates to a process for producing rubber modified styrene polymers and to the styrene polymers resulting therefrom. More specifically, this invention relates to a continuous three-stage mass polymerization process for producing rubber modified styrene polymers of readily controllable molecular weight distribution and microgel particle size.

The bulk processes heretofore employed for producing impact modified styrene polymers generally have been one or two stage processes operating in a batch or semibatch manner wherein the monomeric reactants are progressively polymerized, i.e., the degree of polymerization is continually increasing with respect to time or position, until a high solids level is obtained; thereafter, the unreacted monomer and solvents are removed and the resulting polymer recovered. Unfortunately these processes do not provide any appreciable control over the specific molecular weight distribution of the resulting resin. Control of molecular weight distribution is important since the ultimate use of the resin, e.g., molding, extrusion, etc., is dictated to a substantial degree by the particular molecular weight distribution of the resin. For example, a broad molecular weight distribution is desirable for a molding grade resin; whereas, a narrow molecular weight distribution is sought for an extrusion grade resin. Specific molecular weight distributions have heretofore been obtained mainly by blending resins of different molecular weight. Such techniques, however, require several independent polymerization and recovery processes in addition to a subsequent blending operation.

In addition, control of the microgel particle size of the impact modifier, usually an elastomer adapted to cross-link and graft, has heretofore been a consistent problem. The presence of relatively large particles in the polymer matrix, for example exceeding about 6 microns, even when these particles are invisible to the naked eye, has an adverse effect on physical properties and surface appearance. In a progressive, bulk polymerization, the initial charge to the reactor generally is comprised of the impact modifier dissolved in the monomeric reactants. As the polymerization progresses, the tendency of the dissolved impact modifier to cross-link to form large gel networks results in the formation of visible macrogels which appear in the final product with the concomitant disadvantages thereof. Attempts have been made to overcome macrogel formation by agitating the reaction mass sufficiently to cause chain scission and thus mitigate the undesired consequences of the cross-linking of dissolved rubber. However, as the viscosity of the polymerizing mass increases, the effectiveness of the agitation is substantially reduced because the amount of turnover of the viscous mass and thus the actual exposure of the macrogel to the shear field is greatly diminished. The rate of reactivity of the impact modifier, i.e., its ability to cross-link is, however, unaffected by an increase in viscosity. Thus, in one- or two-stage bulk processes wherein it is necessary to obtain a high solids level and thus a substantially viscous mass, agitation, per se, is not an entirely satisfactory means of controlling particle size.

It is an object of the present invention to provide a process enabling specific control of molecular weight distribution to be readily obtained.

It is another object of this invention to provide rubber modified styrene polymer resins exhibiting specifically tailored matrix molecular weight distributions resulting in an excellent balance of physical and surface properties.

It is still another object to provide means for readily controlling the particle size of impact modifiers resulting in improved physical properties and higher gloss in the styrene polymers.

These and other objects are accomplished by the present invention which broadly provides a continuous mass polymerization process providing controllable molecular weight distribution and graft phase particle size for the preparation of rubber modified styrene polymers, said process including the steps of:

(a) Feeding a monomeric solution comprising styrene and from about 0 to about 1.9 parts by weight acrylonitrile per part by weight styrene to a first stage reactor;

(b) Polymerizing said monomeric solution until at least about 20 percent of said solution is polymerized;

(c) Feeding to said first stage reactor a solution containing from about 2.5 to about 19 percent by weight polymeric butadiene rubber dissolved in a monomeric solution comprising from about 0 to about 1.9 parts by weight acrylonitrile per part by weight styrene, thereby precipitating said polymeric butadiene rubber from said solution;

(d) Dispersing the precipitating polymeric butadiene rubber as discrete droplets uniformly throughout the reaction mass before appreciable cross-linking can occur;

(e) Maintaining the resulting heterogeneous reaction mass at temperatures of from about 130° C. to about 160° C.;

(f) Maintaining the steady state solids level in said first stage reactor at from about 25 to about 50 percent solids during polymerization therein, said solids content comprising a first polymeric fraction of predetermined molecular weight distribution;

(g) Introducing an effluent stream from said first stage reactor to a stirred second stage reactor maintained at temperatures of from about 140° C. to about 160° C.

(h) Maintaining the steady-state solids level in said second stage reactor at about 55 to about 70 percent by weight solids during polymerization therein, said solids content containing a second polymeric fraction of predetermined molecular weight distribution differing or equal to said first polymeric fraction;

(i) Introducing an effluent stream from said second stage reactor to a stirred third stage reactor maintained at temperatures of from about 140° C. to about 185° C.;

(j) Maintaining the steady-state solids level in said third stage reactor at about 70 to about 90 percent by weight solids during polymerization therein, said solids content containing a third polymeric fraction of predetermined molecular weight distribution differing from or equal to said first and second polymeric fractions; and thereafter, (k) Recovering the resulting polymer exhibiting a predetermined composite molecular weight distribution.

It has been found that the present invention enables the obtainment of high impact strength styrene and acrylonitrile/butadiene/styrene (ABS) resins exhibiting specifically tailored molecular weight distributions providing an excellent balance of physical and surface properties. For example, a unique molding grade ABS resin has been obtained through the present invention exhibiting a broad, continuous molecular weight distribution containing a significant amount of very low molecular weight material. The presence of the low molecular weight material is considered of critical importance in obtaining a high gloss, molding grade resin. ABS resins prepared by the present process and exhibiting a discontinuous molecular weight distribution or a continuous molecular weight distribution with no significant low molecular weight portion were found to have poor surface properties even though of about equal average reduced viscosity. ABS resins prepared by the present invention exhibiting narrow molecular weight distributions have been found to be excellent extrusion grade resins. The ability to specifically tailor the molecular weight distribution of styrene resins and copolymers thereof thereby enabling a wide variety of such resins to be produced for different applications on a continuous basis is demonstrated in Table I below. Reduced viscosity values are employed herein as an indication of average molecular weight.

in molding operations. It is further believed that the middle portion of the broad distribution makes the otherwise incompatible high and low ends of the molecular weight distribution compatible.

In order to obtain variable control over both molecular weight distribution and microgel particle size, it is necessary to maintain close control over reactants and operating conditions in each of the three reactor stages.

The reactive monomers, acrylonitrile and styrene, are present in both the initial charge to the first stage reactor and the continuous feed stream thereto in amounts of from about 0 to about 1.9 parts by weight acrylonitrile per part by weight styrene, and preferably when an ABS resign is being produced, from about 0.30 to about 0.33⅓ part by weight acrylonitrile per part by weight styrene. In producing an ABS resin, if less acrylonitrile is employed than indicated above, the resulting material loses mechanical strength and becomes increasingly more susceptible to chemical attack; whereas, if excess acrylonitrile is employed, the probability of forming long polyacrylonitrile sequences increases. Long polyacrylonitrile sequences are disadvantageous due to the tendency of the pendent nitrile groups to internally polymerize resulting in rigid, insoluble, chromophoric structures discoloring the resulting resin. Most preferably the styrene and acrylo-

TABLE I

| | Percent solids in each stage | | | Measured [1] composite reduced viscosity in stages | | | Estimated [2] reduced viscosity of resin being produced in each stage | | | Average reduced viscosity of ABS resin produced | Gloss [3] peak/slope | Minimum [4] pressure to fill mold (p.s.i.) | Composite molecular weight distribution |
|---|---|---|---|---|---|---|---|---|---|---|---|---|---|
| | 1 | 2 | 3 | 1 (RV₁) | 2 (RV₁₊₂) | 3 (RV₁₊₂₊₃) | 1 (RV₁) | 2 (RV₂) | 3 (RV₃) | | | | |
| A | 34 | 63 | 74 | 0.75 | 0.75 | 0.74 | 0.75 | 0.75 | 0.69 | 0.74 | 11/56 | 825 | Narrow distribution. |
| B | 28 | 60 | 73 | 1.26 | 0.84 | 0.75 | 1.26 | 0.54 | 0.37 | 0.75 | 15/70 | 675 | Discontinuous distribution. |
| C | 29 | 63 | 75 | 1.02 | 0.91 | 0.81 | 1.02 | 0.83 | 0.26 | 0.81 | 81/80 | 675 | Broad and uniform distribution with low molecular weight "tail." |

[1] Reduced viscosity measurements are made on the polystyrene-acrylonitrile copolymer extracted from the ABS resin at concentrations of 0.2000 g./100 cc. in methyl ethyl ketone at 25±0.2° C.
[2] The estimated reduced viscosity of polymer being produced in each stage is calculated from the composite R.V. values and the weight percent of the total which is produced in each stage, i.e.,
$RV_2 = \frac{(\text{Wt. percent of } RV_{1+2})(RV_{1+2}) - (\text{Wt. percent of } RV_1)(RV_1)}{(\text{Wt. percent of } RV_2)}$ and $RV_3 = \frac{(\text{Wt. percent of } RV_{1+2+3})(RV_{1+2+3}) - (\text{Wt. percent of } RV_{1+2})(RV_{1+2})}{(\text{Wt percent of } RV_3)}$
[3] Gloss measurements are made on a Hunter Lab Distinctness of Image (D.O.I.) gloss meter, Model D-36, using a 0.5 degree (=10 mil width) slit. The peak gloss value relates to brightness of the reflected light while the slope value relates to the sharpness of image.
[4] Minimum pressure to fill (MPTF) values are derived using a 12 oz. Lester injection molding machine with a "Test Specimen Mold" configuration and a mold temperature of 150° F. The values of these measurements are consistent for the cited configuration but would vary if a different mold cavity or molding machine were used.

The composite reduced viscosity is a weighted average reduced viscosity of the polymer coming into a stage and the polymer being formed therein. It can be seen that only a resin exhibiting a broad and continuous molecular weight distribution with a low molecular weight "tail" provides a high gloss resin suitable for molding applications. It has been found in the present invention that molding grade ABS resins exhibiting an excellent balance of physical properties, moldability and surface gloss can be prepared in the process described above by forming about 30 to 45 percent solids in the first stage reactor having a reduced viscosity of about 0.8 to 1.2; forming about 45 to 55 percent solids in the second stage reactor having a reduced viscosity of about 0.7 to 0.9; and forming about 10 to 25 percent solids in the third stage reactor having a reduced viscosity of 0.1 to 0.5.

While not wishing to be bound by any theory or mechanism, it is presently believed that the very low molecular weight "tail" of the distribution plasticizes the material and causes it to adhere to a mold at temperatures below the temperature at which similar materials which do not contain the low tail adhere to metal. The high end of the distribution imparts good physical properties such as tensile strength and modulus to the resin and also maintains good rubber effectiveness, i.e., the impact strength obtained for a given weight percent of rubber in the product. The broad, continuous distribution provides a shear sensitive, highly non-newtonian material having a low effective viscosity at the high shear rates involved nitrile monomer are employed in their azeotropic ratio of about 0.31 part by weight acrylonitrile per part by weight styrene. It has been found necessary in the present invention to maintain close control over the monomer ratio in each stage in order to insure compatibility of the polymer fractions produced and also to avoid the problems described above. Control over monomer ratio in each stage can be conveniently accomplished by employing the azeotropic ratio of about 0.31 in the feed stream; however, for other compositions wherein one of the monomers becomes depleted in the course of the reaction, supplemental feed streams can be added to each reactor stage thereby maintaining an essentially constant monomer ratio throughout the process.

The impact modifier employed in the present invention is an elastomer which is soluble in acrylonitrile and styrene monomers yet substantially insoluble in the presence of styrene homopolymer or acrylonitrile/styrene copolymer. The impact modifier has a glass transition temperature below about −50° C. Moreover, the impact modifier is preferably a low molecular weight elastomer having a 16 percent solution viscosity (25° C.) in styrene of from about 2000 to about 6000 centipoise. Preferably, the impact modifier is a polymeric butadiene rubber capable of cross-linking and/or grafting under process conditions with acrylonitrile and/or styrene. As used herein and in the appended claims, a "polymeric butadiene rubber" denotes a normally solid polymer containing predominately combined butadiene, the balance thereof comprising at least 50 percent by weight of combined styrene, i.e., vinyl benzene and substituted vinyl benzenes, with the remaining portion of the balance being a combined olefinically unsaturated compound polymerizable therewith such as, for example, methyl methacrylate, acrylonitrile, ethyl acrylate, and the like. The preferred polymeric butadiene rubber is gel free and contains from 0 to about 25 percent by weight combined styrene and from about 75 to 100 percent by weight combined butadiene. Those copolymers containing lesser amounts of combined styrene, i.e., less than about 10 percent by weight, are particularly preferred as "backbones" for the graft terpolymer. The impact strength of the graft terpolymer increases as the combined styrene content of the backbone decreases, particularly as the temperature at which there is subjection to impact is decreased from room temperature.

The amount of polymeric butadiene rubber dissolved in the feed stream depends upon the rubber content desired in the ultimately recovered product and upon the steady state solids level in the third stage reactor according to the following relationship:

Wt. percent polymeric butadiene rubber in feed stream $$= \frac{1}{100} \begin{pmatrix} \text{Wt. percent} \\ \text{solids in 3rd} \\ \text{stage reactor} \end{pmatrix} \begin{pmatrix} \text{Wt. percent poly-} \\ \text{meric butadiene} \\ \text{rubber in product} \end{pmatrix}$$

It has been found that the amount of polymeric butadiene rubber in the feed stream can vary from about 2.5 to about 19 percent by weight depending upon the ultimate impact strength desired. At concentrations below about 2.5 percent, no appreciable impact strength is imparted to the polymer; whereas, in concentrations in excess of about 19 percent, the rubber can normally no longer be maintained at all times as the dispersed phase at a commercially feasible solids content resulting in the formation of visible macrogels in the final product which have an adverse effect on physical and surface properties.

An organic liquid diluent in the feed mix can be used to control the reaction rates in the three reactor stages. The amount of diluent used is not essential, but it has been observed that about 5 to 20 percent by weight keeps the reaction rate at a suitable level. Useful diluents in this invention are low boiling polar organic liquids having relatively low chain transfer activity and having a solubility parameter of from about 9.0 to 10.0 (calories/cm.$^3$)$^{1/2}$. Useful diluents include such organic liquids as ethyl acetate, acetic acid, cyclohexanone, propionitrile, acetone, methyl ethyl ketone and the like. Preferably, the organic liquid diluent is a ketonic polar liquid such as methyl ethyl ketone.

Ethyl benzene, a precursor of styrene, is generally present as an impurity in commercial styrene monomer. Since ethyl benzene has some chain transfer activity and therefore can affect molecular weight distribution, it has been found desirable to maintain the ethyl benzene at a relatively constant concentration in order to preclude interference thereof with the steady state conditions maintained in each of the reactor stages. A concentration level of ethyl benzene of about 5 percent by weight can be conveniently maintained by maintaining the rate of consumption thereof just in excess of the rate of supply of the ethyl benzene in the styrene monomer. The steady state level of ethyl benzene can either be maintained by purging a portion thereof from a recycle stream or by adding a fixed amount to the feed stream. Although it is considered desirable to maintain the ethyl benzene concentration at a constant level it is also considered within the scope of the present invention to employ the chain transfer activity thereof as a means of affecting molecular weight distribution by decreasing the molecular weight of the resin in a particular stage.

Other additives such as antioxidants, stabilizers, fillers, lubricants, colorants, inhibitors, and the like can be added to the polymerization system either by inclusion in the feed addition to a stage reactor, or addition after polymerization but prior to the recovery operations or even during or after the recovery operations. It is considered preferable, although not necessary, that a phenolic inhibitor such as p-tertiary butyl catechol be added to the second or third stage reactor and/or after polymerization but prior to recovery, in minor amounts, e.g., about ¼ of 1 percent, to prevent premature polymerization and growth of polymer in vapor spaces.

The first stage reactor is a stirred reactor or autoclave equipped with a heavy duty agitator designed for efficient liquid dispersion, such as a high speed spinning disc agitator, e.g., a Cowles dissolver blade, flat disc, rotating disc and the like. Multiple bladed or disc agitators can also be employed.

Agitation has heretofore been employed in mass, progressive-type polymerizations to provide homogeneous dispersion of incoming feed, to dissipate the heat of reaction, and to provide chain scission of the rubber while still dissolved in the monomeric feed solution. Initially, in a progressive-type polymerization, the rubber dissolved in the monomer/s constitutes the continuous phase whereas the polymer being formed constitutes the dispersed phase. In each rubber-monomer-polymer system there exists a particular region wherein a phase inversion occurs and the rubber becomes the dispersed phase with the polymer-monomer solution, the continuous phase. While in the continuous phase, the tendency of the rubber to cross-link results in the formation of a gel network, i.e., macrogel particles visible to the naked eye, in the final polymeric product having an adverse effect on physical and surface properties. Amos et al., U.S. 2,694,692 have previously taught that subjecting the reaction mass to a shearing agitation sufficient to cause chain scission of the rubber prevents macrogel formation until, in the course of the reaction the phase inversion point or region is exceeded thereby substantially eliminating the appearance of macrogel in the final product.

Due to the steady state nature of the mass polymerization process of the present invention as opposed to a progressive-type polymerization as heretofore generally employed, the problem of macrogels appearing in the final product is conveniently avoided by maintaining the initial solids level in the first stage reactor at a polymer concentration exceeding that of the phase inversion region for the particular rubber-monomer-polymer system employed. In the present invention, when the feed stream containing polymeric butadiene rubber dissolved in acrylonitrile and/or styrene monomers is introduced to the first stage reactor containing at least about 20 percent by weight styrene homopolymer or acrylonitrile/styrene copolymer, the rubber immediately becomes the dispersed phase and precipitates out of the monomer feed solution. It is therefore of critical importance in the present invention that the agitation in the first stage reactor be sufficient to immediately disperse the precipitating polymeric butadiene rubber uniformly throughout the reaction mass as discrete droplets before any appreciable cross-linking of the rubber occurs. Thereafter, the rubber droplets cross-link to form discrete cross-linked, insoluble particles dispersed throughout the reaction mass to which the styrene or acrylonitrile/styrene chains can graft. It is preferred that the agitation speed in the first stage reactor be sufficient to provide a rapid approach to the equilibrium particle size as determined by the physio-chemical properties of the system. In the process of the present invention at least about 80 percent of the rubber particles in the final product are below about 2 microns in diameter and less than about 1 percent of the particles are larger than about 6 microns. Particles of this size are considered to be microgel as opposed to visible macrogel. The presence of cross-linked microgel having a relatively narrow particle size distribution is of critical importance in obtaining good impact and surface properties in rubber modified styrene resins and copolymers.

The specific agitation speed in the first stage reactor is not narrowly critical and can be widely varied without affecting particle size distribution; however, the shear stress must be relatively constant and sufficient to provide efficient dispersion of the rubber droplets throughout the reaction mass in order that a narrow distribution of rubber particle size be obtained. It has been found in the present invention that a six inch diameter rotating disc agitator operating at about 1000 to 1500 r.p.m. is sufficient to accomplish the above purposes. Of course, the specific r.p.m. of the agitator depends on many factors such as the reactor geometry, blade or disc diameter, torque and the like.

The second and third stage reactors of the present invention are normally substantially larger than the first stage reactor since the reaction rates for the second and third stage reactors are respectively about 33⅓ percent and about 10 percent of the reaction rate of the first stage reactor, although this is not critical. It has been found that stirred autoclaves are particularly well suited for use as the second and third stage reactors, but it is not essential that such means be employed. The agitation in these latter stages must be sufficient to provide uniform composition throughout the reaction mass and also dissipate the heat of reaction. For a twelve inch diameter agitator in the second stage, operation at from about 90 to 150 r.p.m. has been found sufficient. Due to the increased viscosity in the third stage, operation with a similar agitator at from about 40 to 80 r.p.m. has been found sufficient. As indicated above, however, the specific r.p.m. is not critical and varies with the reactor and agitator geometry.

Upon leaving the third stage reactor, the reaction mass is introduced into any of the standard devolatizing devices well known in the art wherein solvent and unreacted monomer are removed from the rubber modified styrene resin or copolymer. The solvent and unreacted monomer can be purified and recycled to the feed stream if desired. The recovered styrene resin or copolymer can then be diced or otherwise placed in condition for packaging or storage for ultimate use. Antioxidants, stabilizers, fillers, lubricants, colorants, inhibitors and other conventioinal additives can be added to the resin system either before, during or after the recovery operation.

In a specific embodiment of the present invention, molding grade ABS resins exhibiting excellent physical and surface properties are prepared by a process wherein a monomeric solution comprising from about 0.27 to about 0.82 part by weight acrylonitrile per part by weight styrene is fed to the first stage reactor. The monomeric solution is partially polymerized in said first stage reactor at temperatures of at least about 135° C. until at least about 20 percent of said solution is polymerized to a copolymer of styrene and acrylonitrile. Alternatively, a solution comprised of about 20 percent preformed acrylonitrile/styrene copolymer dissolved in acrylonitrile and styrene monomers can be employed. Thereafter, a solution containing from about 2.5 to about 19 percent by weight polymeric butadiene rubber dissolved in a monomeric solution comprising from about 0.27 to about 0.82 part by weight acrylonitrile per part by weight styrene is fed to said first stage reactor. The presence of the initially formed copolymer in the first stage reactor in amounts in excess of that required for phase inversion causes the polymeric butadiene rubber in the incoming feed stream to precipitate out of solution. The heavy duty, high speed agitator in the first stage disperses the precipitating rubber as discrete droplets uniformly throughout the reaction mass before appreciable cross-linking of the rubber can occur. The residence time of the heterogeneous mass in the first stage is from about 0.75 to about 1.1 hours at temperatures of from about 133° C. to about 140° C. The steady state solids are maintained at about 28 to 45 percent by weight, by achieving a balance between the throughput rate and the reactor contents or inventory level. The molecular weight distribution of the polymer being formed in said first stage is characterized by the reduced viscosity of the polymer being formed therein. The reduced viscosity values employed herein are determined on a 0.200 gram/100 cc. methyl ethyl ketone solution of matrix material at 25±0.2° C., i.e., on a sample of polymer produced in the first stage after the graft phase has been removed by centrifugation and filtration. The reduced viscosity of the polymer being formed in the first stage is from about 0.8 to about 1.2.

An effluent stream is withdrawn from the first stage reactor and introduced to the second stage reactor wherein the steady state solids level is maintained at about 60 to 70 percent by weight solids. The residence time of the reaction mass in the second stage reactor is from about 2.5 to 3 hours at temperatures of from about 140° C. to about 150° C. The bulk of the polymer, i.e., about 45 to 55 percent, is formed in the second stage. The reduced viscosity of the polymer being formed in the second stage is from about 0.7 to about 0.9.

In general, the dispersed rubber droplets undergo cross-linking within each droplet to form discrete cross-linked rubber particles. The grafting of styrene or acrylonitrile/styrene chains to the cross-linked rubber particles is commenced in the first stage reactor; however, the amount of grafting which occurs in the first stage reactor appears insufficient to prevent the rubber particles from agglomerating. Consequently, although the individual rubber particle size is believed to be characterized in the first stage reactor, the loose agglomerates of microgel size which do form in the first stage, subdivide in the second stage as they undergo further grafting and the particles reach a mature, stable state. It has been found that the rubber particle size distribution leaving the second stage reactor is substantially the same as that appearing in the final product. The process of the present invention has consistently produced a rubber-graft phase particle size distribution containing at least about 80 percent of the particles in the ·0.5 to 2.0 micron range, and less than about 1 percent of the particles larger than 6 microns.

An effluent stream is withdrawn from the second stage reactor and introduced to the third stage reactor wherein the steady state solids level is maintained at about 75 to 85 percent by weight solids. The residence time of the reaction mass in the third stage reactor is from about 2 to 3 hours at temperatures of from about 170° C. to about 185° C. A relatively small percent of the polymer, i.e., about 10 to 25 percent, is formed in the third stage. The reduced viscosity of the polymer being formed in the third stage is from about 0.1 to about 0.5; although, the composite reduced viscosity in the third stage is much higher as described above. From the third stage reactor, the resulting reaction mass is fed to a devolatilizing zone such as the milling apparatus described in the Marshall patent, U.S. 2,434,707, wherein solvent and unreacted monomer are removed from the polymer to produce ABS resins suitable for use in molding applications. The removed solvent and monomers can be purified and recycled, if desired.

It is in this third stage reactor, that the low molecular weight "tail" of the distribution is produced. It is considered of critical importance in the present invention in obtaining an ABS resin exhibiting a good balance of physical properties and good surface properties that the molecular weight distribution be broad and continuous, i.e., with no large gaps, and contain a significant amount, i.e., about 10 to about 25 percent by weight of a very low molecular weight material. For example, high gloss molding grade ABS resins exhibiting a good balance of physical and surface properties have been produced by the continuous, three stage mass polymerization process of the present invention containing about 30 to 45 percent by weight polymer exhibiting a reduced viscosity of from about 0.8 to about 1.2; about 45 to 55 percent by weight polymer exhibiting a reduced viscosity of from about 0.7 to about 0.9; and about 10 to 25 percent by weight polymer exhibiting a reduced viscosity of from about 0.1 to about 0.5.

In another embodiment of the present invention providing an alternative means for incorporating a low molecular weight "tail" into the molecular weight distribution of the styrene resin or copolymer, a chain transfer agent is added into the third stage reactor resulting in a low molecular weight fraction being formed in said third stage. Chain transfer agents which have been found useful are, for example, the low molecular weight aliphatic mercaptans such as n-octyl mercaptan, tertiary dodecyl mercaptan, and the like; also, organic compounds such as the dimer of α-methyl styrene have been found useful. When employed, the chain transfer agent can be fed to the third stage reactor in amounts of from about 0.01 to about 1.5 percent by weight of the reaction mass depending upon the chain transfer constant of the specific agent employed and the monomer content of the third stage. For example, when the chain transfer constant is high, less chain transfer agent is required for a given amount of monomer. When a chain transfer agent is employed, the operating temperature in the third stage reactor is maintained at from about 140° C. to about 155° C. with a resulting decrease in the steady state solids to about 70 to 80 percent solids. Other operating conditions are substantially unaffected. The concentration of unreacted chain transfer agent in the recycle stream, if any, from the devolatilizing zone should be reduced to less than about 50 p.p.m. and preferably less than about 10 p.p.m. prior to introduction of the recycle stream to the feed stream, since concentrations in excess of about 50 p.p.m. have been found to adversely affect the size distribution of the rubber graft phase particles, causing too high a percentage of large particles, i.e., greater than about 6 microns, to be formed.

In still another embodiment of the present invention, a free radical initiator rather than a chain transfer agent can be introduced to the third stage reactor to decrease the molecular weight of the polymeric fraction formed therein. The presence of an initiator increases the total free radicals in the system thereby increasing the termination rate and thus decreasing the molecular weight of the polymer being formed. Organic free radical initiators which have been found useful for this purpose are those having a relatively long half life at operating conditions as compared to mixing time, i.e., the time required for dispersing the incoming stream throughout the reaction mass, but yet a relatively short half life as compared to the residence time in the third stage reactor. In general, useful half lives have been found to be about 10 to 20 minutes at the operating conditions in the reactor. Illustrative of suitable initiators are the peroxides such as di-tertiary-butyl peroxide, tertiary-butyl perbenzoate and the like. The initiator is added to the third stage reactor in amounts of from about 0.01 to about 0.2 percent by weight. When an initiator is employed, the operating temperature in the third stage reactor is lowered to from about 140° C. to 155° C. The other operating conditions are substantially unaffected. Due to the initiator activity, however, the steady state solids return to the original level of from about 75 to about 85 percent solids. Since unreacted initiator would be a deleterious agent elsewhere in the process, it must be destroyed upon leaving the third stage reactor.

To further illustrate the flexibility of control of molecular weight distribution provided by the continuous, three stage mass polymerization process of the present invention, the relatively simple and convenient process modifications required to produce an extrusion grade ABS resin with a narrow molecular weight distribution are described below.

The apparatus, feed stream compositions and basic operating procedures for producing an extrusion grade resin are substantially identical to those for producing a molding grade resin. The essential differences lie in the steady state conditions maintained within the three reactor stages. The polymeric butadiene rubber in the feed stream to the first stage reactor is precipitated and dispersed as described hereinabove. The heterogeneous reaction mass is maintained in the first stage reactor for from about 0.75 to about 1.1 hours at temperatures of from about 140° C. to about 148° C. The steady state solids level is maintained at about 28 to 45 percent by weight solids. The reduced viscosity of the polymer being formed in the first stage reactor is from about 0.75 to about 0.90.

An effluent stream from the first stage reactor is fed to the second stage reactor maintained at temperatures of from about 140° C. to about 150° C. The reaction mass is maintained in the second stage for from about 2.5 to 3.5 hours. The steady state solids level is maintained at about 60 to 70 percent by weight solids. The reduced viscosity of the polymer being formed in the second stage reactor is from about 0.70 to about 0.85. It has been found that operating the second stage reactor in the above manner results in a composite reduced viscosity for the second stage closely approaching or equal to that produced in the first stage.

An effluent stream from the second stage reactor is fed to the third stage reactor maintained at temperatures of from about 140° C. to about 155° C. The reaction mass is maintained in the third stage for from about 2 to 3 hours. The steady state solids level is maintained at about 70 to 80 percent solids. The reduced viscosity of the polymer being formed in the third stage is from about 0.60 to about 0.80. The composite reduced viscosity in the third stage closely approaches or equals the composite reduced viscosity in the first and second stages resulting in a molecular weight distribution for the final ABS resin which is quite narrow as is desirable for an extrusion grade resin. As a typical example of the extremely narrow molecular weight distribution which can be obtained in the continuous, three stage mass polymerization process of the present invention, an extrusion grade ABS resin was produced wherein 48 percent of the final polymer was produced in the first stage reactor and had a reduced viscosity of 0.76; 36 percent of the final polymer was produced in the second stage reactor and also had a reduced viscosity of 0.75; and 16 percent of the final polymer was produced in the third stage reactor and had a reduced viscosity of 0.69. The composite reduced viscosity of the third stage based on a weighted average as described above was 0.74.

It has been found in the present invention that the rubber-graft phase particle size distribution is of critical importance in obtaining good surface properties, especially high gloss, in both molding and extrusion grade resins. As described hereinabove, a broad, contanuous molecular weight distribution containing a significant amount of a low molecular weight "tail" has been found to be of significant importance in obtaining a molding grade resin exhibiting good physical and surface properties. In addition, it has been found that the rubber-graft phase particle size distribution is also of prominent importance in obtaining good physical and surface properties. ABS resins having the specific broad molecular weight distribution described above and a rubber-graft phase particle size distribution containing at least 80 percent of the particles in the range of from about 0.5 to about 2.0 microns and less than about 1 percent of the particles larger than about 6 microns, have been found to be excellent molding grade resins exhibiting a good balance of physical and surface properties. In addition, ABS resins having a narrow molecular weight distribution and the rubber-graft phase particle size distribution described above have been found to be excellent extrusion grade resins.

In a further embodiment of the present invention, control of the rubber-graft phase particle size distribution is provided enabling the consistent obtainment of a rubber-graft phase particle distribution containing at least 80 percent of the particles in the range of from about 0.5 to about 2.0 microns and less than about 1 percent of the particles larger than about 6 microns. It is apparent, of course, that due to the variable control over the particle size distribution provided herein, other particle size distributions can be obtained; however, for purposes of the present invention, the above described particle size distribution is preferred.

The process of the present invention as described hereinabove depends primarily on thermal variations in the three reactor stages to obtain the desired molecular weight distributions. In the present process, the rubber particle size, although generally believed to be characterized in the first stage reactor, does not attain its mature, stable dimensions therein, i.e., the particle size dimensions appearing in the final resin, due to agglomeration and insufficient grafting in the first stage. Further reaction time in the second stage reactor is required for this purpose.

It has been found that adding an organic free radical initiator to the first stage reactor and decreasing the temperature therein and in the second stage reactor has enabled the rubber-graft particle size to be finally determined in the first stage reactor thereby eliminating further subdivision in the second stage reactor. Achieving control over particle size distribution in the first stage reactor substantially reduces agitation requirements and associated problems in the second and third stage reactors where the viscosity of the reaction mass is high.

Organic free radical initiators suitable for this purpose are those having a relatively long half life at operating conditions as compared to the mixing time, i.e., the time required for uniformly dispersing the feed throughout the reaction mass, but yet a relatively short half life as compared to the residence time in the first reaction stage. In general, useful half lives have been found to be about 10 to 20 minutes at the operating conditions in the reactor. Illustrative of suitable initiators are the peroxides such as benzoyl peroxide, and/or azobisisobutyronitrile, and the like. The initiator is added to the first stage reactor in amounts of from about 0.01 to about 0.2 percent by weight.

The presence of a free radical initiator in the first stage reactor accelerates the grafting reaction thereby enabling the rubber particles to reach maturity, and thus stability, therein. The presence of initiator in the first stage reactor under the thermal conditions described hereinabove, i.e., about 130° C. to about 150° C., would tend to result in too coarse a particle size being formed; accordingly, the temperature in the first stage reactor is decreased to from about 80° C. to about 120° C. The decrease in temperature compensates for the presence of initiator thereby maintaining equivalent reaction rates. Due to the presence of initiator in the effluent stream from the first stage reactor, it is also necessary to decrease the operating temperatures in the second stage reactor to from about 130° C. to about 142° C. to maintain equivalent reaction rates. Since the initiator is essentially spent prior to leaving the second stage reactor, no further adjustment in operating conditions is required in the third stage reactor or in the recovery operations. All other operating conditions in the first and second stage reactors remain substantially unaffected by initiator addition.

The following examples are illustrative of specific applications of the principles of the present invention, but are not to be construed as limiting the scope thereof.

EXAMPLE 1

An initial feed solution consisting of 12.75 pounds styrene monomer, 4.25 pounds acrylonitrile, 1.0 pound methyl ethyl ketone and 1.0 pound ethyl benzene were charged to a three gallon stirred autoclave serving as a first stage reactor, and equipped with a reflux condenser and a 6-inch diameter rotating disc agitator operating at 1500 r.p.m. The reactor contents were heated and allowed to polymerize until the reaction mass was refluxing at 135° C. at a pressure of 26 p.s.i.g. Under these conditions, the percent solids had reached about 20 percent.

A reactant feed solution containing 63.8 percent styrene, 21.2 percent acrylonitrile, 5.0 percent of a butadiene-styrene rubber containing about 5 percent styrene and having a 16 percent solution viscosity in styrene of about 4000 centipoises at 25° C.; together with 5.0 percent ethyl benzene and 5.0 percent methyl ethyl ketone was warmed to about 100° C. and metered into said first stage reactor at a rate of 20 pounds per hour. A portion of the reaction mass in the first stage reactor was simultaneously pumped to the second stage reactor at a rate of 20 pounds per hour so as to maintain a constant inventory of 19 pounds in the first stage reactor. The second stage reactor consisted of a 10-gallon stirred autoclave having a reflux condenser and a 12-inch diameter anchor type agitator rotating at 120 r.p.m. The mass inventory in this stage was allowed to build up to 49 pounds and then a portion of the reaction mass was withdrawn at a rate of 20 pounds per hour and pumped into the third stage reactor. The third stage reactor consisted of a 10 gallon stirred autoclave equipped with a reflux condenser and a 12-inch diameter anchor type agitator rotating at 60 r.p.m. A stream consisting of 0.55 pound per hour of a 12 percent solution of tertiary dodecyl mercaptan in methyl ethyl ketone was metered into the third stage. The mass inventory in this stage was allowed to build up to 48 pounds and then a portion of the reaction mass was withdrawn at a rate of about 20 pounds per hour and pumped to an in line gear mixer wherein 0.1 pound per hour of an alkylated phenol inhibitor (Wingstay T, manufactured by Goodyear Tire and Rubber Co.) was added to the reaction mass. The stabilized reaction mass leaving the mixer at 20.1 pounds per hour was then transferred continuously to a devolatilizing mill in which the unreacted monomers and solvents were removed. The molten resin leaving the mill was stranded and diced.

Over a period of 17 hours the operation was brought to steady state, during which period the transition product was discarded. The pressure in the first stage was adjusted so that the resulting temperature of the boiling reaction mass was held at 134° C. at a solids content of 28.5 percent. The reduced viscosity of the matrix in the first stage was 1.02. In like manner, the temperature in the second stage was maintained at 145° C., the solids content at 63 percent and the composite reduced viscosity of the matrix was 0.91, indicating a reduced viscosity of polymer being formed in the second stage of 0.83. Similarly, the temperature in the third stage was maintained at 145° C., the solids content at 75.0 percent and the composite reduced viscosity was 0.81, indicating a reduced viscosity of polymer being formed in the third stage of 0.26.

The product was found to have the following analysis and properties:

Ratio acrylonitrile/styrene—0.32
Percent rubber—6.5
Particle size distribution: 0.5–2.0$\mu$—90%
                               >6$\mu$—<1%
Izod impact strength (ft. lb./in. of notch at 73° F.) ASTM D256—1.2
Minimum pressure to fill mold—675 p.s.i.g.
Hunterlab D.O.I. Gloss: peak—81%
                           slope—80%

The resulting molecular weight distribution for the high gloss, molding grade resin as characterized by the reduced viscosity of the polymer formed in each stage was as follows: 34 percent by weight of the total polymer was formed in the first stage reactor and had a reduced viscosity of 102; 49 percent by weight of the polymer was formed in the second stage and had a reduced viscosity of 0.83; and 17 percent of the polymer was formed in the third stage and had a reduced viscosity of 0.26. The resulting molecular weight distribution is seen to be broad and continuous and contains a significant low molecular weight "tail."

EXAMPLE 2

Employing the same apparatus and procedures described in Example 1, an initial feed solution consisting of 10.8 pounds of styrene monomer, 3.4 pounds acrylonitrile, 0.9 pound ethyl benzene and 0.9 pound methyl ethyl ketone were charged to the first stage reactor. The reactor contents were heated and allowed to polymerize until the reaction mass was refluxing at 148° C. at a pressure of 37 p.s.i.g. Under the conditions, the percent solids had reached 35 percent.

A reactant feed solution containing 63.6 percent styrene monomer, 19.9 percent acrylonitrile, 6.5 percent of the butadiene-styrene rubber described in Example 1, 5.0 percent ethyl benzene and 5.0 percent methyl ethyl ketone was warmed to about 100° C. and metered into said first stage reactor at a rate of 20 pounds per hour. A portion of the reaction mass in the first stage reactor was simultaneously pumped to the second stage reactor at a rate of 20 pounds per hour so as to maintain a constant inventory of 16 pounds in the first stage reactor. The inventory in the second stage was allowed to build up to 50 pounds and then a portion of the reaction mass was withdrawn at a rate of 20 pounds per hour and pumped into the third stage reactor. The inventory in this stage was allowed to build up to 50 pounds and then a portion of the reaction mass was withdrawn at a rate of 20 pounds per hour and pumped to an in-line gear pump mixer wherein 0.1 pound per hour of the alkylated phenol inhibitor described in Example 1 was added to the reaction mass. The stabilized reaction mass was then devolatilized, stranded and diced as described in Example 1.

Once steady state was attained, the pressure in the first stage was adjusted so that the resulting temperature of the boiling reaction mass therein was held at 148° C. at a solids content of 35 percent. The reduced viscosity of the matrix in the first stage was 0.86. In like manner, the temperature in the second stage was maintained at 148° C., the solids content at 65 percent and the composite reduced viscosity of the matrix was 0.82, indicating a reduced viscosity of polymer being formed in the second stage of 0.78. Similarly, the temperature in the third stage was maintained at 148° C., the solids content at 75 percent and the composite reduced viscosity was 0.80, indicating a reduced viscosity of polymer being formed in the third stage of 0.70.

The product was found to have the following analysis and properties:

Ratio acrylonitrile/styrene—0.32
Percent rubber—8.7
Particle size distribution: 0.5–2.0$\mu$—90%
                                   >6$\mu$ . . .
Izod impact strength (ft. lb./in. of notch at 73° F.) ASTM D256—1.6
Minimum pressure to fill mold—850 p.s.i.g.
Hunterlab D.O.I. Gloss: peak—45%
                         slope—80%
Tensile strength (ASTM D638)—6500–7000 p.s.i.

The resulting molecular weight distribution for the resin as characterized by reduced viscosity of polymer formed in each stage was as follows: 41 percent of the total polymer was formed in the first stage reactor and had a reduced viscosity of 0.86; 44 percent of the polymer was formed in the second stage and had a reduced viscosity of 0.78; and 15 percent of the polymer was formed in the third stage and had a reduced viscosity of 0.70. The resulting molecular weight distribution is narrow with no low molecular weight component. The resin exhibits a good balance of physical properties thereby finding application as an extrusion grade resin; however, due to the absence of the low molecular weight component, the molded surface gloss is poor precluding its use for molding applications.

EXAMPLE 3

Employing the same apparatus and basic procedures described in Example 1, the same initial feed solution was heated and polymerized in the first stage reactor until the reaction mass was refluxing at about 110° C. at a pressure of 7 p.s.i.g. Under these conditions, the solids content reached about 20 percent. The reactant feed solution described in Example 1 was then metered to the first stage reactor at a rate of 20 pounds per hour. In addition, a stream consisting of 0.14 pound per hour of a 4 percent solution of benzoyl peroxide in methyl ethyl ketone was metered into said first stage. A portion of the reaction mass in the first stage reactor was simultaneously pumped to the second stage reactor at a rate of 20 pounds per hour so as to maintain a constant inventory of 19 pounds in the first stage reactor. A stream consisting of 240 grams per hour of an 8 percent solution of tertiary dodecyl mercaptan in methyl ethyl ketone was metered into the second stage. The mass inventory in the second stage was allowed to build up to 47 pounds and then a portion of the reaction mass was withdrawn at a rate of 20 pounds per hour and pumped to the third stage reactor. The mass inventory in the third stage was allowed to build up to 52 pounds and then a portion of the reaction mass was withdrawn at a rate of 20 pounds per hour and pumped to an in-line gear mixer wherein 0.1 pound per hour of the alkylated phenol inhibitor employed in Example 1 was added. The stabilized reaction mass was then devolatilized, stranded and diced in the manner described in Example 1.

Once steady state was attained, the pressure in the first stage was adjusted so that the resulting temperature of the boiling mass was held at 110° C. at a solids content of 28 percent. The reduced viscosity of the matrix in the first stage was 1.26. In like manner, the temperature in the second stage was maintained at 142° C., the solids content at 60 percent and the composite reduced viscosity of the matrix was 0.84, indicating a reduced viscosity of polymer being formed in the second stage of 0.54. Similarly, the temperature in the third stage was maintained at 145° C., the solids content at 72 percent and the composite reduced viscosity was 0.75, indicating a reduced viscosity of polymer being formed in the third stage of 0.37.

The product was found to have the following analysis and properties:

Ratio acrylonitrile/styrene—0.32
Percent rubber—6.9
Particle size distribution: 0.5–2.0$\mu$—95%
                                   >6$\mu$—<1%
Izod impact strength (ft. lb./in. of notch at 73° F.) ASTM D256—1.2
Minimum pressure to fill mold—675 p.s.i.g.
Hunterlab D.O.I. Gloss: peak—15%
                         slope—70%

The resulting molecular weight distribution as characterized by reduced viscosity of the polymer formed in each stage was as follows: 34 percent by weight of the total polymer was formed in the first stage reactor and had a reduced viscosity of 1.26; 47 percent by weight of the polymer was formed in the second stage and had a reduced viscosity of 0.54; and 19 percent by weight polymer of the polymer was formed in the third stage and had a reduced viscosity of 0.37. The resulting molecular weight distribution is discontinuous having a large gap therein. The resulting resin molds easily but has poor surface gloss indicating incompatibility of the molecular weight fractions in the resin. Accordingly, the resin is unsatisfactory for molding applications, and due to a poor balance of physical properties, has limited utility as an extrusion grade material.

What is claimed is:

1. Continuous mass polymerization process providing controllable molecular weight distribution and microgel particle size for the preparation of rubber modified styrene polymers comprising the steps of:

(a) feeding a monomeric solution comprising styrene and from about 0 to about 1.9 parts by weight acrylonitrile per part by weight styrene to a first stage reactor;

(b) polymerizing said monomeric solution until at least about 20 percent of said solution is polymerized;

(c) feeding to said first stage reactor a solution containing from about 2.5 to about 19 percent by weight polymeric butadiene rubber dissolved in a monomeric solution comprising styrene and from about 0 to about 1.9 parts by weight acrylonitrile per part by weight styrene thereby precipitating said polymeric butadiene rubber from said solution;

(d) dispersing the precipitated polymeric butadiene rubber as discrete droplets uniformly throughout the reaction mass before appreciable cross-linking can occur;

(e) maintaining the resulting heterogeneous reaction mass at temperatures of from about 130° C. to about 160° C.;

(f) maintaining the steady state solids level in said first stage reactor at from about 25 to about 50 percent solids during polymerization therein, said solids content comprising a first polymeric fraction of predetermined molecular weight distribution;

(g) introducing an effluent stream from said first stage reactor to a stirred second stage reactor maintained at temperatures of from about 140° C. to about 160° C.

(h) maintaining the steady state solids level in said second stage reactor at about 55 to about 70 percent by weight solids during polymerization therein, said solids content containing a second polymeric fraction of predetermined molecular weight distribution;

(i) introducing an effluent stream from said second stage reactor to a stirred third stage reactor maintained at temperatures of from about 140° C. to about 185° C.;

(j) maintaining the steady state solids level in said third stage reactor at about 70 to about 90 percent by weight solids during polymerization therein, said solids content containing a third polymeric fraction of predetermined molecular weight distribution; and thereafter, (k) recovering the resulting polymer exhibiting a predetermined composite molecular weight distribution.

2. Process as defined in claim 1 wherein the monomeric solutions are comprised of from about 0.30 to about 0.33⅓ part by weight acrylonitrile per part by weight styrene.

3. Process as defined in claim 2 wherein the monomeric solutions are comprised of acrylonitrile and styrene in an azeotropic ratio of about 0.31 part by weight acrylonitrile per part by weight styrene.

4. Process as defined in claim 1 wherein the feed solutions contain from about 5 to about 20 percent by weight of a low-boiling polar organic liquid having a solubility parameter of from about 9.0 to about 10.0 (calories/cm.$^3$)$^{1/2}$.

5. Process as defined in claim 4 wherein the low boiling polar organic liquid is methyl ethyl ketone.

6. Continuous mass polymerization process providing controllable molecular weight distribution and microgel particle size for the preparation of high gloss molding grade styrene polymers comprising a mixture of an acrylonitrile/styrene copolymer and a graft terpolymer of acrylonitrile/styrene copolymer grafted on a polymeric butadiene rubber, said process including the steps of:

(a) feeding a monomeric solution comprising styrene and from about 0.27 to about 0.82 part by weight acrylonitrile per part by weight styrene to a first stage reactor;

(b) polymerizing said monomeric solution at temperatures of at least about 135° C. until at least about 20 percent of said solution is polymerized;

(c) feeding to said first stage reactor a solution containing from about 2.5 to about 19 percent by weight polymeric butadiene rubber dissolved in a monomeric solution comprising styrene and from about 0.27 to about 0.82 part by weight acrylonitrile per part by weight styrene thereby precipitating said polymeric butadiene rubber from said solution;

(d) dispersing the precipitated polymeric butadiene rubber as discrete particles uniformly throughout the reaction mass before appreciable cross-linking can occur;

(e) heating the resulting heterogeneous reactor mass to a temperature of from about 133° C. to about 140° C.;

(f) maintaining the steady state solids level in said first stage reactor at from about 28 to 45 percent solids during polymerization therein, said solids content comprising a first polymeric fraction having a reduced viscosity of from about 0.8 to about 1.2;

(g) introducing an effluent stream from said first stage reactor to a stirred second stage reactor maintained at temperatures of from about 140 to about 150° C.;

(h) maintaining the steady state solids level in said second stage reactor at about 60 to about 70 percent by weight solids during polymerization therein, said solids content containing a second polymeric fraction having a reduced viscosity at from about 0.7 to about 0.9;

(i) introducing an effluent stream from said second stage reactor to a third stage reactor maintained at temperatures of from about 170° C. to about 185° C.;

(j) maintaining the steady state solids level in said third stage reactor at from about 70 to about 85 percent by weight solids during polymerization therein, said solids content containing a third polymeric fraction having a reduced viscosity of from about 0.1 to about 0.5; and thereafter, (k) recovering the resulting polymer exhibiting a predetermined composite molecular weight distribution.

7. Process as defined in claim 6 wherein the monomeric solutions are comprised of from about 0.30 to about 0.33⅓ part by weight acrylonitrile per part by weight styrene.

8. Process as defined in claim 7 wherein the monomeric solutions are comprised of acrylonitrile and styrene in an azeotropic ratio of about 0.31 part by weight acrylonitrile per part by weight styrene.

9. Process as defined in claim 6 wherein the feed solutions contain from about 5 to about 20 percent by weight of a low-boiling polar organic liquid having a solubility parameter of from about 9.0 to about 10.0 (calories/cm.$^3$)$^{1/2}$.

10. Process as defined in claim 6 which additionally comprises feeding from about 0.01 to about 1.5 percent by weight of an organic chain transfer agent to the third stage reactor; maintaining the temperature in said third stage reactor at from about 140 to about 155° C. and the steady state solids therein at about 70 to about 80 percent by weight solids during polymerization therein.

11. Process as defined in claim 6 which additionally comprises feeding from about 0.01 to about 0.2 percent by weight of an organic free radical initiator to the third stage reactor and maintaining the temperature within said reactor at from about 140 to about 155° C.

12. Process as defined in claim 6 wherein the rubber graft particle size is finally determined in the first stage reactor by feeding from about 0.01 to about 0.2 percent by weight of an organic free radical initiator to the first stage reactor, maintaining the temperature in said first stage reactor at from about 80 to about 120° C. and maintaining the temperature in the second stage reactor at from about 130° to about 142° C.

13. Continuous mass polymerization process providing controllable molecular weight distribution and microgel particle size for the preparation of extrusion grade styrene polymers comprising a mixture of an acrylonitrile/styrene copolymer and a graft terpolymer of acrylonitrile/styrene copolymer grafted onto a polymeric butadiene rubber, said process including the steps of:
  (a) feeding a monomeric solution comprising styrene and from about 0.27 to about 0.82 part by weight acrylonitrile per part by weight styrene to a first stage reactor;
  (b) polymerizing said monomeric solution until at least about 20 percent of said solution is polymerized;
  (c) feeding to said first stage reactor a solution containing from about 2.5 to about 19 percent by weight polymeric butadiene rubber dissolved in a monomeric solution comprising styrene and from about 0.27 to about 0.82 part by weight acrylonitrile per part by weight styrene thereby precipitating said polymeric butadiene rubber from said solution;
  (d) dispersing the precipitated polymeric butadiene rubber as discrete particles uniformly throughout the reactor mass before appreciable cross-linking can occur;
  (e) heating the resulting heterogeneous reactor mass to temperatures of from about 140° C. to about 148° C.;
  (f) maintaining the steady state solids level in said first stage reactor at from about 28 to about 45 percent solids during polymerization therein, said solids content comprising a first polymeric fraction having a reduced viscosity of from about 0.75 to about 0.90;
  (g) introducing an effluent stream from said first stage reactor to a stirred second stage reactor maintained at temperatures of from about 140 to 150° C.;
  (h) maintaining the steady state solids level in the second stage reactor at about 60 to about 70 percent by weight solids during polymerization therein, said solids content containing a second polymeric fraction having a reduced viscosity of from about 0.70 to about 0.85;
  (i) introducing an effluent stream from said second stage reactor to a stirred third stage reactor maintained at temperatures of from about 140° C. to about 155° C.;
  (j) maintaining the steady state solids level in said third stage reactor at about 70 to about 80 percent by weight solids during polymerization therein, said solids content containing a third polymeric fraction having a reduced viscosity of from about 0.60 to about 0.80; and thereafter
  (k) recovering the resulting polymer exhibiting a predetermined composite molecular weight distribution.

14. Process as defined in claim 13 wherein the monomeric solutions are comprised of from about 0.30 to about 0.33⅓ part by weight acrylonitrile per part by weight styrene.

15. Process as defined in claim 14 wherein the monomeric solutions are comprised of acrylonitrile and styrene in an azeotropic ratio of about 0.31 part by weight acrylonitrile per part by weight styrene.

16. Process as defined in claim 13 wherein the feed solutions contain from about 5 to about 20 percent by weight of a low-boiling polar organic liquid having a solubility parameter of from about 9.0 to about 10.0 $(calories/cm.^3)^{1/2}$.

17. Process as defined in claim 13 wherein the rubber graft particle size is finally determined in the first stage reactor by feeding from about 0.01 to about 0.2 percent by weight of an organic free radical initiator to the first stage reactor, maintaining the temperature in said first stage reactor at from about 80° C. to about 120° C. and maintaining the temperature in the second stage reactor at from about 130° C. to about 142° C.

18. Molding grade high impact strength styrene polymer possessing high surface gloss and comprising a matrix of acrylonitrile/styrene copolymer and a dispersed graft phase comprising a graft terpolymer of acrylonitrile/styrene copolymer grafted onto a polymeric butadiene rubber, said matrix comprising 30 to 45 percent by weight of said copolymer having a reduced viscosity of from about 0.8 to 1.2, about 45 to 55 percent of said copolymer having a reduced viscosity of from about 0.7 to 0.9 and about 10 to 25 percent by weight of said copolymer having a reduced viscosity of from about 0.1 to 0.5, said dispersed graft phase containing from about 2 to about 28 percent by weight polymeric butadiene rubber based on said styrene polymer.

19. Molding grade high impact strength styrene polymer as defined in claim 18 wherein the particle size distribution of the dispersed graft terpolymer phase comprises at least about 80 percent of said particles in the range of from about 0.5 to about 2.0 microns and less than about 1 percent of said particles larger than about 6 microns.

References Cited

UNITED STATES PATENTS

| 2,349,136 | 5/1944 | Britton et al. | |
| 2,704,753 | 3/1955 | Monaghan | 260—89.1 |
| 2,864,802 | 12/1958 | Price et al. | 260—874 |
| 3,144,420 | 8/1964 | Fryling | 260—880 XR |
| 3,278,642 | 10/1966 | Lee | 260—880 |
| 3,311,675 | 3/1967 | Doak et al. | 260—880 |
| 3,330,786 | 7/1967 | Finestone et al. | 260—876 XR |
| 3,373,227 | 3/1968 | Finestone et al. | 260—880 |

FOREIGN PATENTS

| 1,005,681 | 9/1965 | Great Britain. |
| 1,007,640 | 10/1965 | Great Britain. |

SAMUEL H. BLECH, Primary Examiner

J. C. BLEUTGE, Assistant Examiner

U.S. Cl. X.R.

260—880